(12) United States Patent
Hayes

(10) Patent No.: US 12,417,359 B2
(45) Date of Patent: Sep. 16, 2025

(54) AI HALLUCINATION AND JAILBREAKING PREVENTION FRAMEWORK

(71) Applicant: Unum Group, Chattanooga, TN (US)

(72) Inventor: Reed Hayes, Chattanooga, TN (US)

(73) Assignee: Unum Group, Chattanooga, TN (US)

(*) Notice: Subject to any disclaimer, the term of this patent is extended or adjusted under 35 U.S.C. 154(b) by 229 days.

(21) Appl. No.: 18/229,504

(22) Filed: Aug. 2, 2023

(65) Prior Publication Data
US 2025/0045531 A1     Feb. 6, 2025

(51) Int. Cl.
| | |
|---|---|
| *G06N 3/045* | (2023.01) |
| *G06F 16/33* | (2019.01) |
| *G06F 16/3331* | (2025.01) |
| *G06F 16/334* | (2025.01) |
| *G06F 16/338* | (2019.01) |
| *G06F 21/64* | (2013.01) |
| *G06F 40/10* | (2020.01) |
| *G06F 40/20* | (2020.01) |
| *G06F 40/279* | (2020.01) |
| *G06F 40/40* | (2020.01) |

(52) U.S. Cl.
CPC ............. *G06F 40/40* (2020.01); *G06F 16/33* (2019.01); *G06F 16/3331* (2019.01); *G06F 16/334* (2019.01); *G06F 16/3344* (2019.01); *G06F 16/338* (2019.01); *G06F 21/64* (2013.01); *G06F 40/10* (2020.01); *G06F 40/20* (2020.01); *G06F 40/279* (2020.01); *G06N 3/045* (2023.01)

(58) Field of Classification Search
CPC .......... G06F 40/40; G06F 21/64; G06F 40/56; G06N 3/045; G06N 3/047
See application file for complete search history.

(56) References Cited

U.S. PATENT DOCUMENTS

| | | | |
|---|---|---|---|
| 11,875,130 B1 * | 1/2024 | Bosnjakovic | G06N 5/022 |
| 12,063,123 B1 * | 8/2024 | Rivera-Rodriguez | H04L 12/1831 |
| 12,229,040 B2 * | 2/2025 | Rudenko | G06F 11/3604 |
| 2023/0351120 A1 * | 11/2023 | Gelfenbeyn | G06N 3/006 |
| 2024/0160902 A1 * | 5/2024 | Padgett | G06N 3/0895 |
| 2024/0202221 A1 * | 6/2024 | Siebel | G06F 16/3347 |

(Continued)

OTHER PUBLICATIONS

Helping Large Language Models Protect Themselves: An enhanced filtering and summarization system, Muhaimen et al, May 5, 2025, https://arxiv.org/pdf/2505.01315 (Year: 2025).*

(Continued)

*Primary Examiner* — Linda Wong
(74) *Attorney, Agent, or Firm* — Miller & Martin PLLC

(57) ABSTRACT

The disclosed embodiments include systems and methods configured to provide a Generative AI framework that uses the power of multiple LLMs by separating the generative aspect into multiple distinct large language models. In some disclosed embodiments, a first large language model evaluates an input prompt and transforms it if needed (e.g., in a first processing stage of the framework); a second large language model performs a generative function based on an input prompt it receives from the first large language model (e.g., in a second processing stage); and a third large language model analyzes and as necessary transforms the output of the second large language model to ensure accuracy, no hallucinations, and no harmful content in the final generated response to the input prompt (e.g., in a third processing stage).

31 Claims, 9 Drawing Sheets

(56) References Cited

U.S. PATENT DOCUMENTS

2024/0346162 A1* 10/2024 Luitjens .............. H04L 63/0407
2024/0403634 A1* 12/2024 Hawes ..................... G06N 3/08

OTHER PUBLICATIONS

JailbreaksOverTime: Detecting Jailbreak Attacks under Distribution Shift, Piet et al, Apr. 28, 2025, https://arxiv.org/pdf/2504.19440 (Year: 2025).*

Safeguarding Large Language Models: A Survey, Dong et al, Jun. 3, 2024, https://arxiv.org/pdf/2406.02622 (Year: 2024).*

Diversity Helps Jailbreak Large Language Models, Zhao et al, May 11, 2025, https://arxiv.org/pdf/2411.04223 (Year: 2025).*

S. Wolfram, "What Is ChatGPT Doing . . . and Why Does It Work?" dated Feb. 14, 2023, and downloaded on Aug. 2, 2023 at https://writings.stephenwolfram.com/2023/02/what-is-chatgpt-doing-and-why-does-it-work.

"Hallucination (artificial intelligence)," Wikipedia The Free Encyclopedia, downloaded on Aug. 2, 2023 at https://en.wikipedia.org/wiki/Hallucination_(artificial_intelligence).

A. VK, "This Could Be The End of Bing Chat" dated Feb. 9, 2023, and downloaded on Jul. 15, 2023 at https://analyticsindiamag.com/this-could-be-the-end-of-bing-chat.

M. Leone, "AI needs guardrails as generative AI runs rampant" dated Jun. 8, 2023, and downloaded on Aug. 2, 2023 at https://www.techtarget.com/searchenterpriseai/opinion/AI-needs-guardrails-as-generative-AI-runs-rampant.

* cited by examiner

AI HALLUCINATION AND JAILBREAKING PREVENTION FRAMEWORK

FIELD OF THE INVENTION

The present disclosure relates generally to generative artificial intelligence (Generative AI) systems and methods capable of generating content using a large language model (LLM) and, more particularly, to systems and methods using a novel framework comprising multiple LLMs that cooperate to prevent hallucinations, jailbreaking, and harmful generated content in Generative AI systems.

BACKGROUND OF THE INVENTION

Generative AI is a type of artificial intelligence capable of generating new text, data, images, art, music, code, molecules, and/or other information based on inputs ("prompts") provided by users. Generative AI systems are typically implemented using a deep learning architecture employing multi-layered neural networks that have been pre-trained using extremely large sets of training data. Existing Generative AI systems include but are not limited to OpenAI's ChatGPT, Google's Bard, Microsoft's Prometheus, and Meta's LLaMA. In fact, the number and variety of Generative AI systems is expected to increase substantially as companies and other researchers and developers continue to create, refine, and improve these powerful artificial intelligence tools for new applications.

LLMs, or large language models, often play a crucial role in Generative AI, particularly in the generation of text-based outputs such as natural language responses, chatbots, and story generation. As used herein, an LLM may comprise any machine learning model for natural language processing, natural language generation, and/or machine translation using at least one neural network. For an LLM trained on a large corpus of textual content, for example, the LLM may comprise a transformer algorithm or recurrent neural network which may be further combined with an attention mechanism. The LLM may be configured to apply unsupervised machine learning to an input data set, such as training data, to learn patterns from unlabeled input data to dynamically modify ("learn") weight values for its neural network. The LLM also may be trained using a supervised model where the input data can be mapped to certain known outputs.

Generative AI using an LLM can provide an extremely powerful artificial-intelligence based engine that is capable of generating human-like text and perform many tasks. Current Generative AI text models, however, suffer significant disadvantages that can make them undesirable for many applications.

For example, current LLMs have been known to be "jailbroken" (as explained below) via user-prompt engineering. As noted above, a LLM is a trained machine learning model that may generate text based on a prompt provided by a user. The LLM may be configured to have rules and/or other restrictions ("guardrails") that prevent the LLM from answering certain user prompts based on the information requested or language in the prompt. There are several available third-party guardrail libraries and utilities that can work together with existing LLMs to provide such restrictions. As used herein, jailbreaking refers to the ability of a user to circumvent or override one or more functional and/or content restrictions of the LLM. For instance, if the LLM is configured to avoid providing confidential personal identity information (PII), subject to data-privacy laws and regulations, a user could nonetheless jailbreak the LLM to gain unauthorized access to such PII by methodical selection of user prompts that cause the LLM to break its own rules and restrictions, e.g., sometimes referred to as prompt-injection attacks.

Another significant issue with current LLMs is the possibility that the model "hallucinates" and produces factually incorrect information. Generative AI hallucinations have been a problem for large language models since their inception. There have been known instances where LLMs have cited non-existent persons, documents, quotations, facts, and legal cases in response to user prompts. Many use cases for Generative AI are going to have high costs associated with the LLM getting an answer wrong or otherwise creating non-existent sources of information, both of which are "hallucinations" as used herein.

Most companies will struggle with launching their Generative AI products unless they can solve for Generative AI hallucinations and prevent jailbreaking. There is a current need in the art for improvements to conventional Generative AI/LLM systems to address these problems.

SUMMARY OF THE INVENTION

The present invention overcomes the disadvantages of the prior art by providing a Generative AI framework that uses the power of multiple LLMs by separating the generative aspect into multiple distinct large language models. In some disclosed embodiments, a first large language model evaluates an input prompt from a requesting user and transforms it if needed (e.g., in a first stage of the framework); a second large language model performs a generative function based on an input prompt it receives from the first large language model (e.g., in a second stage); and a third large language model analyzes and, as necessary, transforms the output of the second large language model to ensure accuracy, no hallucinations, and no harmful content of a final generated response to return to the requesting user (e.g., in a third stage). Advantageously, the systems and methods using this new multi-staged framework can prevent virtually all hallucinations which, in turn, will dramatically lower the cost of errors for use cases therefore making them economically viable. The framework also has the advantage of additional security mechanisms to counter prompt-injection attacks and prevent jailbreaking.

In accordance with some embodiments, the multiple distinct LLMs in the Generative AI framework may be combined in various ways. In some embodiments, for example, there may be more than one LLM implemented in the first, second, and/or third stages of the framework. By way of example, a company may want to employ separate LLMs in the first stage of the framework to analyze and transform input prompts directed to different divisions or departments within the company. In this example, the company may want a first LLM in the first stage to analyze and transform input prompts directed to human-resources issues and a different LLM in the first stage to analyze and transform input prompts directed to engineering issues. In some embodiments, the input prompts generated by each of the LLMs in the first stage may be fed as inputs to a common generative LLM in the second stage of the framework. More than one LLM similarly could be implemented in the second and/or third stages of the framework.

In some alternative embodiments, the first stage and its large language model may be omitted entirely and only the second and third large language models may be used in the framework. In other alternative embodiments, the third stage may be omitted and only the first and second large language models may be used. In yet other embodiments, any of the LLMs in the first, second, and/or third stages may be further configured to generate output data based, at least in part, on application of their respective guardrails to input data and/or output data. Those skilled in the art will appreciate that the multiple distinct LLMs in the disclosed embodiments herein may be allocated among the different stages of the Generative AI framework, preferably in a feed-forward configuration, in accordance with many different possible architectures for interconnecting LLMs between the stages of the Generative AI framework.

In some disclosed embodiments, any one or more of the multiple distinct LLMs may be implemented in a single artificial intelligence (AI) engine within one or more computer systems. Each LLM may be separately trained depending on its functionality within the Generative AI framework. Each LLM may be provided with a corresponding set of input training data that tunes the weight values in its machine learning model using an unsupervised machine learning process, and may be further fine-tuned using a supervised machine learning process. The LLMs in the disclosed embodiments may be implemented using various algorithms and logical configurations including, but not limited to, neural networks and deep learning models having multiple interconnected processing layers.

In some embodiments, the Generative AI systems and methods in the disclosed embodiments may be accessed by one or more remote users using at least one cloud service and/or application specific programming interface. One or more users also may be assigned login credentials to access the systems and methods. In some embodiments, users may interact with a user interface of the system that enables them to submit user prompts and receive generated responses from the Generative AI framework. In some embodiments, there may be at least one user interface that enables a user to adjust parameters and/or guardrails for one or more of the LLMs in the framework. The systems, methods, and computer-readable media configured to provide the Generative AI framework described herein may be implemented on a single computer system or on multiple computers over a distributed system, such as an enterprise network, or on a cloud platform.

These and other aspects, advantages, and features of the invention will become apparent to those skilled in the art based on the various exemplary embodiments disclosed in the following detailed description and appended claims with reference to the accompanying drawings, all of which form a part of this specification.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF THE DISCLOSED EMBODIMENTS

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific systems and methods described herein. Such equivalents are considered to be within the scope of this invention and are covered by the claims.

Figure 1:
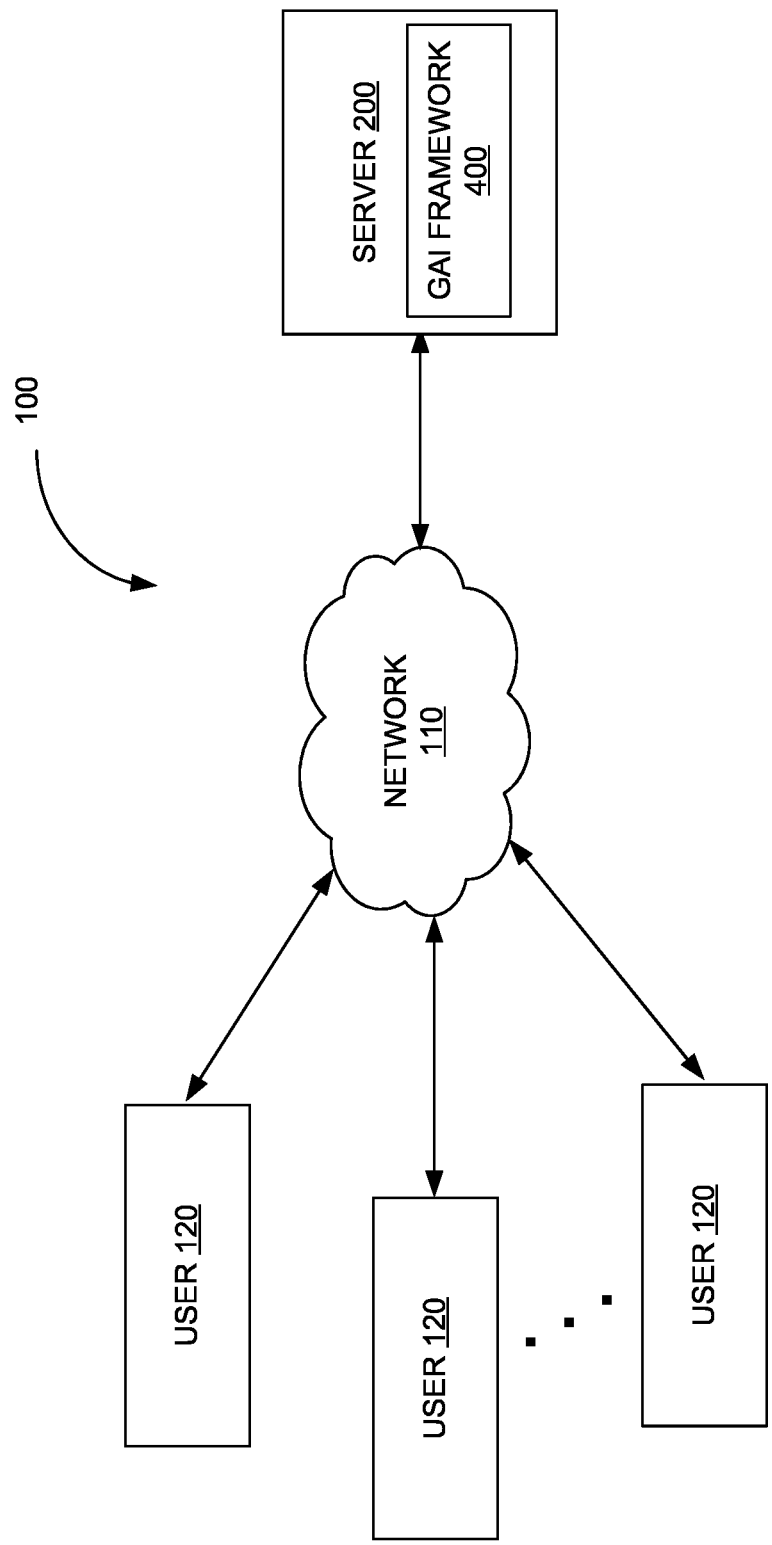
FIG. 1 is a schematic block diagram of an exemplary network configuration that may be used in accordance with certain disclosed embodiments of the invention.

FIG. 1 shows an exemplary network architecture 100 that may be used to provide systems and methods for using a Generative AI framework 400 in accordance with certain disclosed embodiments. In this exemplary architecture, one or more users 120 may communicate with a server 200 over a network 110. The server 200 may be owned, operated, and/or controlled by a company, governmental agency, or any other entity or entities that provides the systems and methods described herein. In some embodiments, the server 200 may comprise one or more computers configured to receive user prompts from users 120, process the prompts using the Generative AI framework 400, and return generated responses. The user prompts and responses may be exchanged over the network 110 as packets or messages formatted according to any one or more network communication protocols, such as the Transmission Control Protocol, Internet Protocol, and/or Ethernet, as would be known in the art.

The server 200 may provide the functionality of the Generative AI framework 400, as described herein, and in some embodiments may be further configured to provide additional functionality. In some embodiments, the server 200 may be implemented using one or more computers in a cloud-based network architecture, such that users 120 may communicate with the framework 400 using at least one cloud-based service on the server 200. In other embodiments, at least some users 120 may communicate with the server 200 over a local network, such as an enterprise network, or over a private virtual network implemented over a public network, such as the Internet. Yet other users 120 may be able to directly communicate through user interfaces at the server 200 if they are physically co-located.

As used herein, a user 120 may comprise any individual, device, computer, or system that is configured to communicate with the server 200. In some embodiments, a user 120 may be able to login to the server 200 for the purpose of training and/or configuring the Generative AI framework 400. The user may have login credentials to the server that permit the user to remotely access the Generative AI framework 400 or, alternatively, may access the server 200 directly, for example, through a user interface presented to the user at the server.

The network 110 may include wired and/or wireless connections. More generally, the network may comprise any configuration of interconnected computers and/or other devices for effectuating communications between the users 120 and the server 200. The network 110 may comprise, for example, one or more public wide-area networks, such as the Internet, and/or local area networks, such as proprietary enterprise networks, and may include one or more telecommunication networks, such as cellular networks and Public Switched Telephone Networks (PSTN). The network 110 may support packet-based and/or circuit-switched communications. Accordingly, it will be appreciated that network 110 is not intended to be limiting and that the scope of this disclosure includes implementations in which components of the exemplary architecture 100 may be operatively linked via various types of communication channels and physical transmission media.

Figure 2:
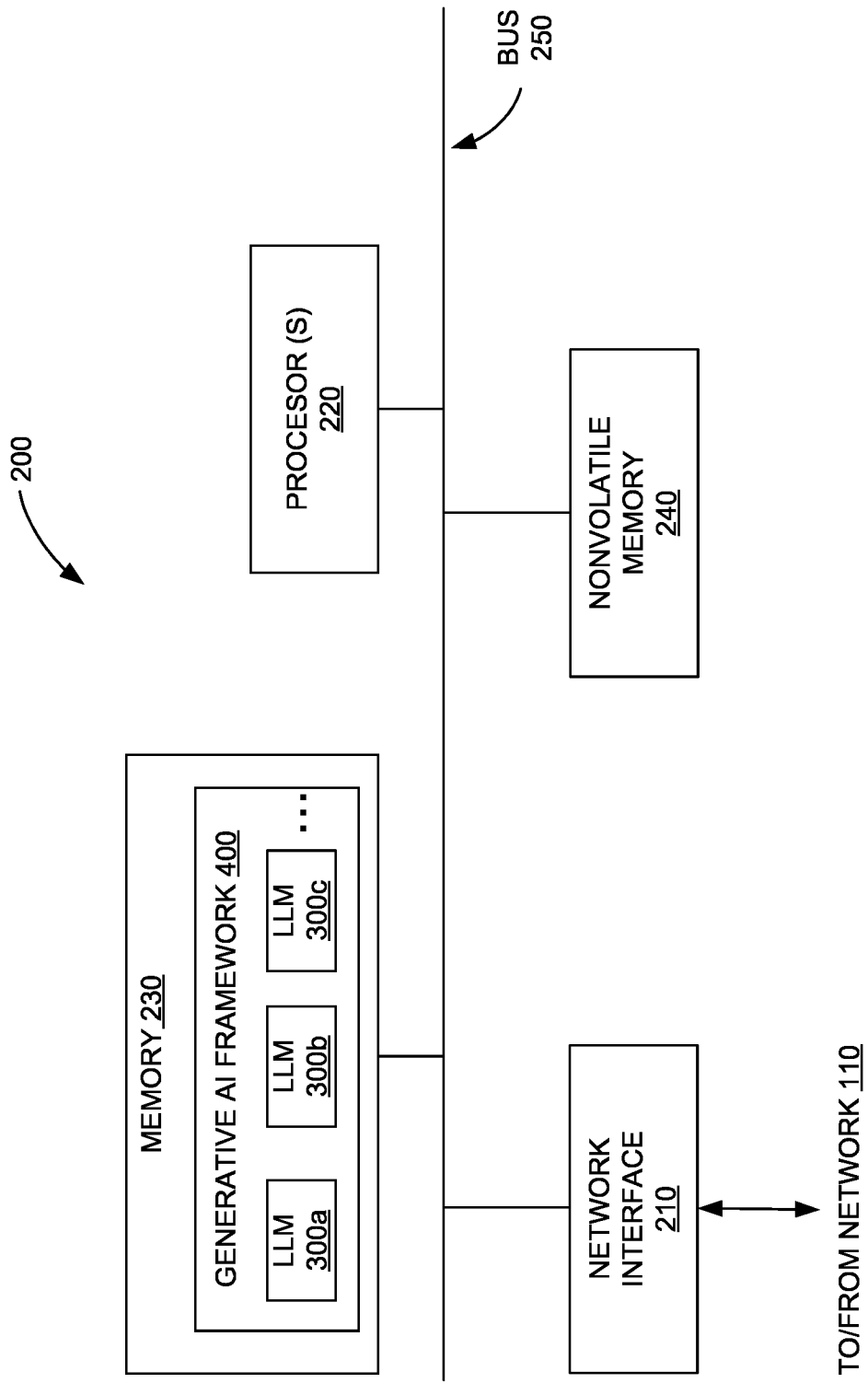
FIG. 2 is a schematic block diagram of an exemplary server that may be used to implement at least one aspect of the systems and methods described herein in accordance with certain disclosed embodiments of the invention.

FIG. 2 is a schematic block diagram of an exemplary server 200 that may be used in accordance with one or more of the embodiments described herein. The exemplary server 200 may comprise one or more network interfaces 210 (e.g., wired, wireless, etc.), one or more processors 220, a memory 230, and a nonvolatile memory 240, interconnected by a system bus 250. The server 200 also may contain other components, such as a power supply, memory controller(s), a display/monitor, keyboard, mouse, printer, and so forth, which are not shown in FIG. 2 for purposes of clarity. Further, those skilled in the art will appreciate that the hardware and software components of server 200 described below may be deployed in a single computer or alternatively may be distributed among multiple interconnected computers.

The network interface(s) 210 include the mechanical, electrical, and signaling circuitry for communicating data to and from the network 110. The network interfaces may be configured to transmit and/or receive data using a variety of different communication protocols and data formats, and may include any wireless or wired/physical connections configured to communicate over different types of networks.

The one or more physical processors 220 (also interchangeably referred to herein as processor(s) 220, processor 220, or processors 220 for convenience) may be configured to provide information processing capabilities in the exemplary server 200. The processor(s) 220 may comprise one or more of a microprocessor, microcontroller, central processing unit, application specific integrated circuit, field programmable gate array, digital signal processor, or any other circuit, state machine, and/or other mechanism configured to electrically process information in accordance with the disclosed embodiments herein.

The memory 230 comprises a plurality of storage locations that are addressable by the processor(s) 220 and/or the network interface(s) 210 for storing software programs, data structures, and data associated with the embodiments described herein. The processor(s) 220 may comprise hardware elements or hardware logic adapted to execute computer-executable instructions stored in the memory 230 for implementing multiple LLMs 300a, 300b, and/or 300c that provide the Generative AI framework 400. Software programs and data corresponding to the LLMs 300a-c may be loaded into the memory 230 from the nonvolatile storage 240, which may be a hard drive, solid state drive, battery-backed random access memory, or any other form of persistent memory as known in the art. Similarly, software and/or data that has been modified in the memory 230 may be committed to longer term storage in the nonvolatile memory 240. Each of the memory 230 and nonvolatile memory 240 may comprise one or more interconnected memories. In some embodiments, data stored in the memory 230 and/or nonvolatile memory 240 may be obtained from a remote database or server (not shown), for example, accessible to the server 200 over one or more of the network interfaces 210.

The processor(s) 220 may be configured to execute computer readable instructions stored in the memory 230 to provide functionality of the Generative AI framework 400 in accordance with the disclosed embodiments described herein. The Generative AI framework 400 preferably includes a plurality of LLMs 300a, 300b, and/or 300c that are logically interconnected and configured to perform multiple processing stages when their computer-readable instructions are executed by the processor(s) 220. In addition, the memory 230 also may contain other computer readable instructions (not shown in FIG. 2) that when executed by the processor(s) 220 provide, for example, an operating system, network protocol stack, and other software processes, services, and applications.

For example, in some disclosed embodiments, the first LLM 300a may be used to transform and/or filter user prompts that the server 200 receives from users 120 over the network interface(s) 210 as part of a first processing stage of the Generative AI framework 400; the second LLM 300b may be used to provide normal generative AI functionality based on transformed and/or filtered user prompts that it receives from the first LLM 300a as part of a second processing stage of the framework; and the third LLM 300c may be used to transform and/or filter outputs generated by the second LLM 300b as part of a third processing stage of the framework. The transformed and/or filtered output data, such as text-based responses, generated by the third LLM 300c may be returned to the requesting users 120 (and formatted as necessary) using computer-readable software instructions executed by the processor(s) 220.

Figure 3A:
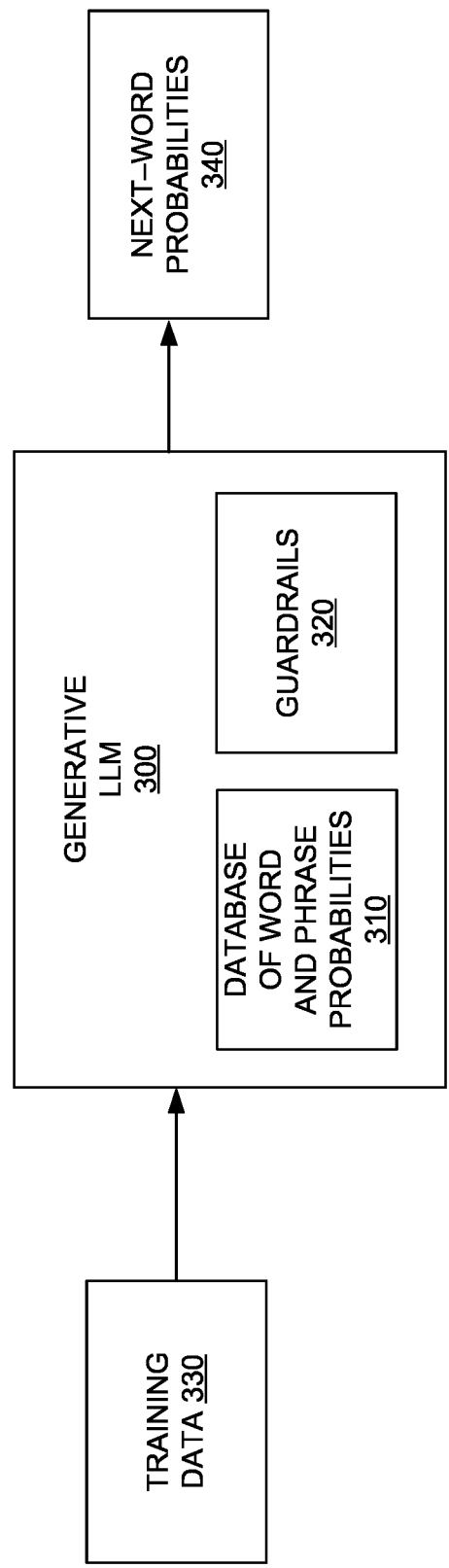
FIG. 3A is a schematic block diagram of an exemplary LLM that may be trained to determine probabilities of words and phrases in accordance with certain disclosed embodiments of the invention.

FIG. 3A shows an exemplary generative LLM 300, which may correspond to any of the LLMs 300a, 300b, and 300c, that may be trained to determine probabilities of words and phrases for generating text-based outputs in accordance with certain disclosed embodiments. The LLM 300 in FIG. 3A may be configured to receive input data and then, based on the input data, generate a text-based output by sequentially selecting words, phrases, and/or punctuation based on the probabilities of which words, phrases, and/or punctuation would be most likely to start its output or follow its currently generated output sequence. The words, phrases, and punctuation more generally may be represented as "tokens" within the LLM 300, such that the LLM may generate an output sequence based on next-token probabilities. For ease of explanation herein, those skilled in the art will appreciate that a "word" or "text," as described herein, may correspond to any one or more words, phrases, punctuations, and/or other units of input data that can be tokenized for processing by the LLM 300.

The LLM 300 may be configured to generate output responses using any algorithm(s) including, but not limited to, neural networks, transformer models, and deep learning models having multiple interconnected processing layers having associated weight values that configure the algorithm(s). For simplicity and ease of explanation, the generative algorithm(s) used in the LLM 300 may be more generally referenced herein as its "machine learning model."

Figure 3B:
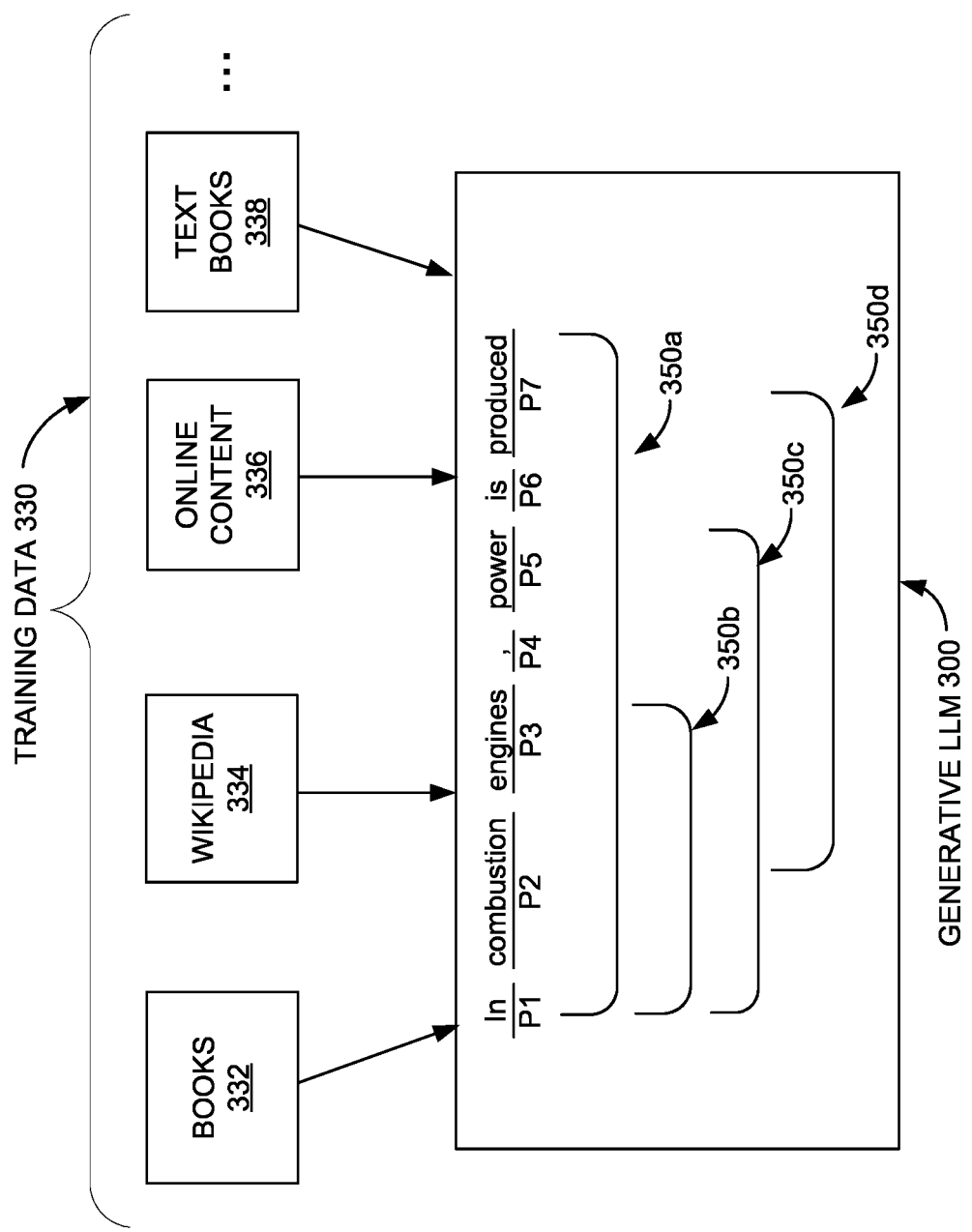
FIG. 3B is a schematic block diagram of exemplary training data that may be used to determine word and phrase probabilities in the LLM of FIG. 3A in accordance with certain disclosed embodiments of the invention.

The LLM 300 in FIG. 3A may process training data 330 to determine next-word probabilities 340 that it may use to later process future input data. As FIG. 3B shows, the training data 330 preferably consists of extremely large sets of data, such as obtained from books 332, Wikipedia 334, online content 336, text books 338, or other sources. In some embodiments, the training data 330 may comprise textual content in any spoken or computer languages and/or any other input data that can be modeled as a natural language for purposes of natural language processing. The LLM 300 may comprise a database of word and phrase probabilities 310, which may be stored in the memory 230 of the server 200. The database 310 may further include probabilities of punctuation alone or in combination with words and phrases. The LLM 300 also may comprise one or more guardrails 320, e.g., stored in memory 230, that configure the LLM to impose predetermined rules and restrictions on received input data and/or generated output data.

In FIG. 3B, for example, the generative LLM 300 may process a large quantity of input data 330 to determine separate probabilities P1 through P7 corresponding to the individual words and punctuation within the phrase "In combustion engines, power is produced." In this example, the LLM 300 also may determine a probability for occurrence of the entire phrase 350a as well as separate probabilities for the partial phrases 350b ("In combustion engines"), 350c ("In combustion engines, power"), and 350d ("combustion engines, power is produced"). The probabilities determined by the LLM 300 may be stored in the LLM's associated database 310, e.g., stored in the memory 230.

The training data 330 also may be used to tune the weight values in the LLM's machine learning model using an unsupervised machine learning process. That is, as the LLM 300 processes the large quantity of training data 330, it may adjust one or more weight values of its machine learning model to associate input data with generated output data (or clusters of output data). In some embodiments, a second set of training data 330 may be known to correspond to certain next-word probabilities. In such embodiments, the weight values of the LLM 300 may be further fine-tuned using a supervised machine learning process, for example, where the generated next-word probabilities for the second set of training data are matched to their known probabilities. This may be useful where the LLM 300 will be used to generate output data for a specific application or where the input data will be confined to certain subject matter. As an example, consider a company where the LLM 300 will be used to generate output data relating only to topics relating to employee benefits. In this example, the second set of training data may correspond to the specific employee benefit information and benefit plans in the company.

Figure 3C:
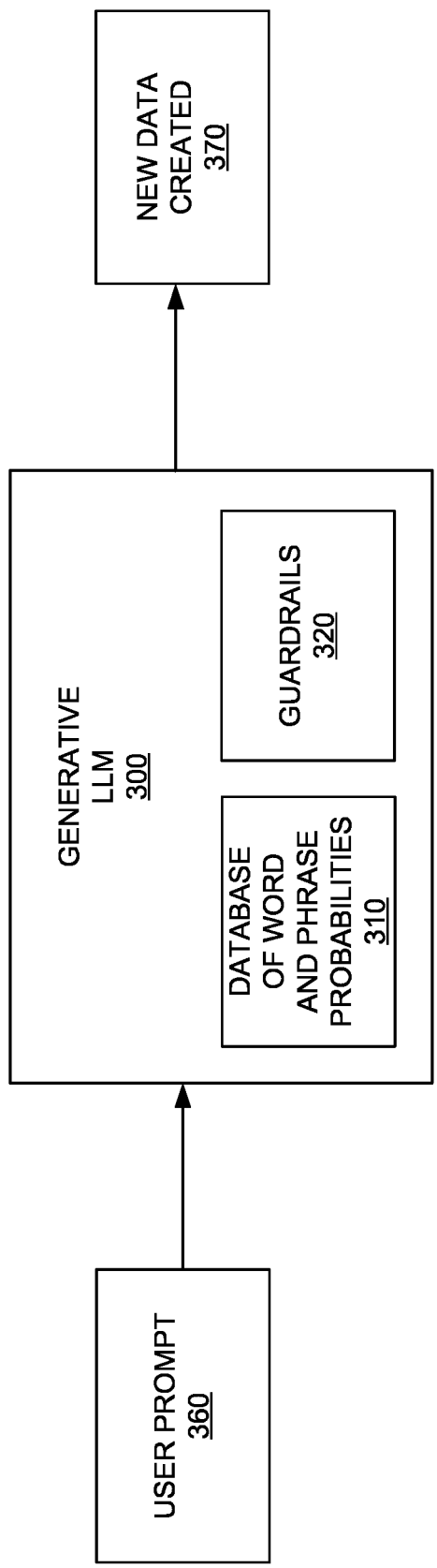
FIG. 3C is a schematic block diagram showing the exemplary LLM in FIG. 3A that may be used to process a user prompt to create new data in accordance with certain disclosed embodiments of the invention.
Figure 3D:
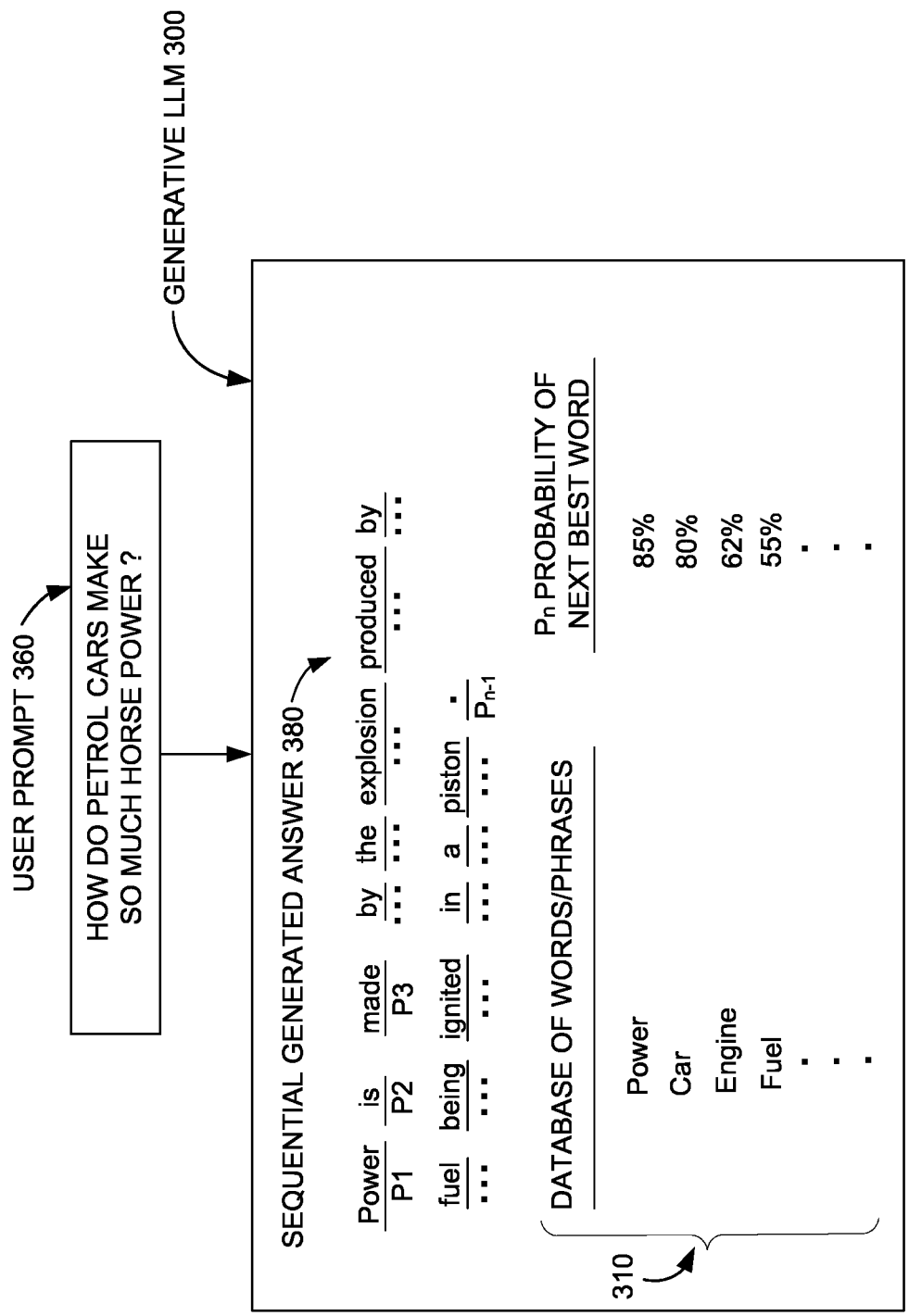
FIG. 3D is a schematic block diagram of an exemplary user prompt that may be used to generate a textual response using the LLM of FIG. 3A in accordance with certain disclosed embodiments of the invention.

FIGS. 3C and 3D shows the exemplary LLM 300 in FIG. 3A, after it has been trained using training data 330, used to process an exemplary user prompt 360 to create new data 370. In this example, the LLM 300 receives a user prompt 360 consisting of the question "How do petrol cars make so much horse power?" The exemplary LLM 300 sequentially generates an answer 380 to this input prompt 360, on a word by word basis, based on probabilities stored in its database of words and phrases 310 and the weight values of its machine learning model. Again referring to the exemplary user prompt 360 in FIG. 3D, the LLM 300 uses its machine learning model and probability database 310 to determine that the word "Power" has the highest probability for starting the sequential generated answer 380. In this example, the LLM determines that the next most probable word in the answer is the word "is." The LLM sequentially generates the answer 380, in this example word-by-word, based on the probabilities of each word P1 through Pn−1 appearing in the generated answer. In this manner, the generated answer in FIG. 3D includes a first sentence "Power is made by the explosion produced by fuel being ignited in a piston." Based on the probability (Pn) in the database 310 for possible next words, the LLM may begin a second sentence in the answer 380 again with the word "Power."

According to the disclosed embodiments of the invention, the Generative AI framework 400 comprises interconnected LLMs 300a-c that separate the generative aspect into multiple distinct large language models. In some embodiments, the framework 400 and its LLMs may be part of a larger artificial intelligence engine (not shown in FIG. 2) at the server 200. Unlike prior Generative AI systems and methods, the disclosed embodiments provide novel systems and methods for using multiple LLMs with machine learning to improve and optimize generated output data. Using the multi-staged framework 400 can prevent virtually all hallucinations and counteract conventional prompt-injection attacks and prevent jailbreaking.

Figure 4A:
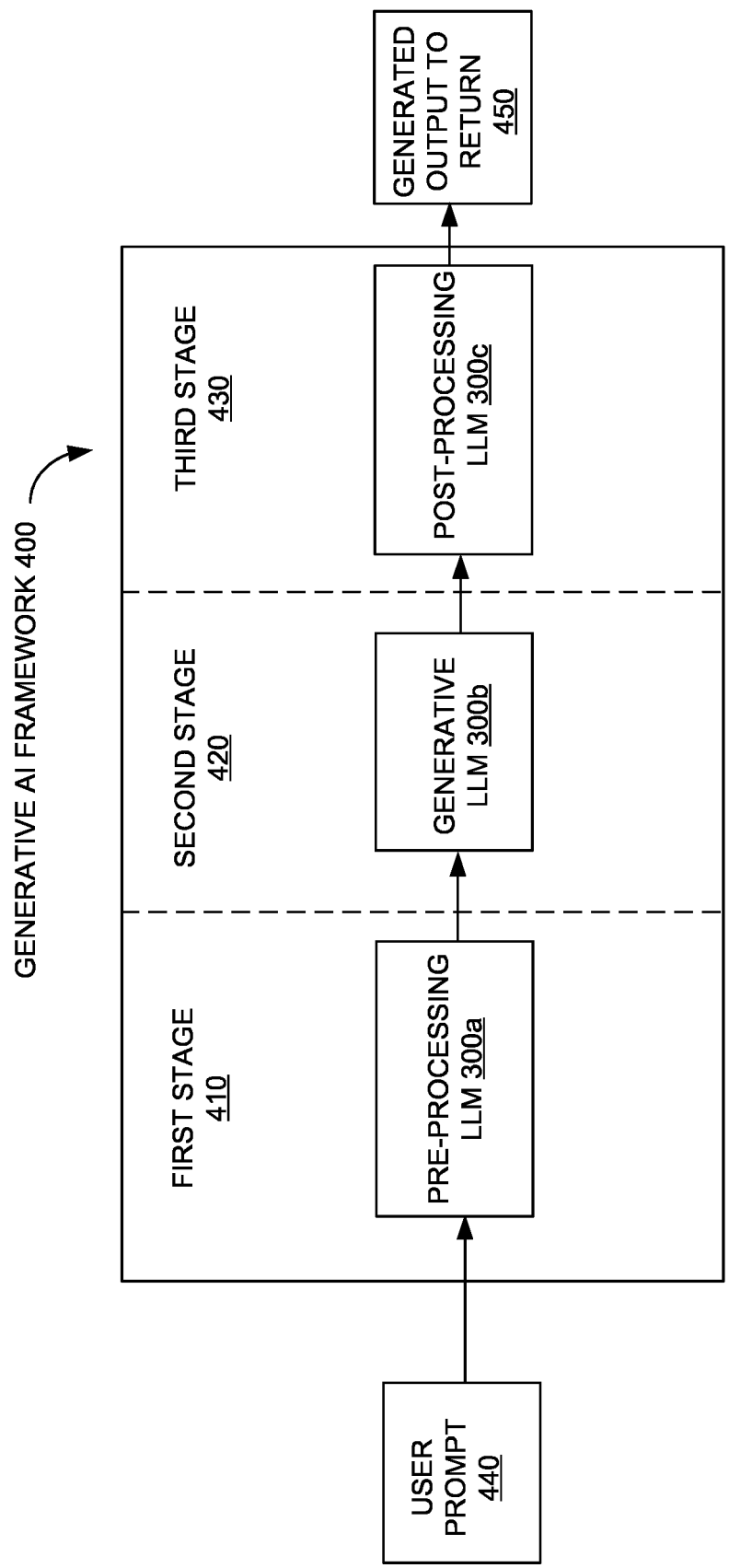
FIG. 4A is a schematic block diagram of a first exemplary embodiment of a Generative AI framework in which multiple LLMs are interconnected between first, second, and third processing stages in the framework in accordance with certain disclosed embodiments of the invention.

In some disclosed embodiments, the Generative AI framework 400 is separated into three different LLMs 300. In the exemplary embodiment of FIG. 4A, the framework 400 may comprise a first processing stage 410, a second processing stage 420, and a third processing stage 430. In this disclosed embodiment, a received user prompt 440 may be sequentially processed by a pre-processing LLM 300a, generative LLM 300b, and a post-processing LLM 300c within the framework to generate an output 450 that may be returned to a requesting user 120.

The pre-processing LLM 300a may provide user-prompt engineering. This LLM 300a may be configured to receive the user prompt 440 and use its machine learning model together with its database 310 and/or guardrails 320 to generate an updated user prompt that can be fed as an input to the generative LLM 300b in the second stage 420. The function of the LLM 300a may be to detect jailbreaking/malicious prompts 440, detect out of scope questions in the received prompt 440, and transform the received user-built prompt into an updated prompt that is better suited for generating a response using the LLM 300b. This LLM 300a may be trained and/or otherwise configured to classify received user prompts 440 to determine if they are attempting to jailbreak the guardrails 320 before an answer is generated. The LLM 300a can also be configured to screen and/or test for harmful language in the received user prompt 440 and filter such harmful content out of the user prompt before sending an updated prompt to the second-stage LLM 300b for actual generation of a response. In this manner, the LLM 300a may be configured to transform the received user prompt 440 to remove malicious or jailbreaking content or content that is outside of a scope of permitted user prompts.

Those skilled in the art will appreciate that it is possible that the updated user prompt generated by the pre-processing LLM 300a could be the same as, or substantially similar to, the original user prompt 440, depending on the received user prompt 440 and the prior training of the LLM 300a. Otherwise, the updated user prompt generated by the LLM 300a in the first stage 410 may be a modified, filtered, supplemented, substitute, and/or otherwise transformed version of the original user prompt 440.

In the second stage 420, the generative LLM 300b processes the updated user prompt from the pre-processing LLM 300a using its machine learning model together with its database 310 and/or guardrails 320 to generate a response to the updated user prompt. The LLM 300b may implement any Generative AI machine learning model for generating a response to the updated prompt that has been filtered/transformed from the first stage 410. In this way, this LLM 300b is configured to actually build a generative answer in response to the updated prompt that has been screened by the first-stage large language model 300a.

The generated response from the generative LLM 300b may be input to a post-processing LLM 300c in the third stage 430 of the Generative AI framework 400. The post-processing LLM 300c may use its machine learning model together with its database 310 and/or guardrails 320 to provide a hallucination and harmful-content checking stage. For example, the LLM 300c may be configured to perform an analysis on the generated response from the generative LLM 300b and test for AI hallucinations and harmful content in the response generated by the generative LLM 300b. For example, in some embodiments, the post-processing LLM 300c may process the received output from the LLM 300b as an input and generate an updated output 450 to return to the requesting user 120. In alternative embodiments, the post-processing LLM 300c may generate its own answer to the received user prompt 440, or to the updated user prompt generated by the first-stage LLM 300a, and then compare its new generated answer to the answer it received from the generative LLM 300b. In such embodiments, the LLM 300c may be configured to generate its updated output 450 by revising or replacing the output it received from the generative LLM 300b based on its comparison to its own generated output.

Those skilled in the art will appreciate that it is possible that the updated output 450 generated by the LLM 300c in the third stage 430 could be the same as, or substantially similar to, the output generated by the LLM 300b in the second stage 420. Otherwise, the updated output 450 generated by the LLM 300c in the third stage 430 may be a modified, filtered, supplemented, substitute, and/or otherwise transformed version of the output that it receives from the generative LLM 300b in the second stage 420 of the framework 400. In some embodiments, if hallucinations or harmful content are detected in the generated response from the generative LLM 300b, then the post-processing LLM 300c may either modify, filter, supplement, and/or transform the generated response or otherwise replace the generated answer with a more accurate and/or appropriate output 450 to return to the requesting user 120.

All of the processing stages 410, 420, and 430 of the Generative AI framework 400 together are effectively evaluating/transforming the user prompt, generating the answer, and finally double checking the answer that has been generated for hallucinations.

Figure 4B:
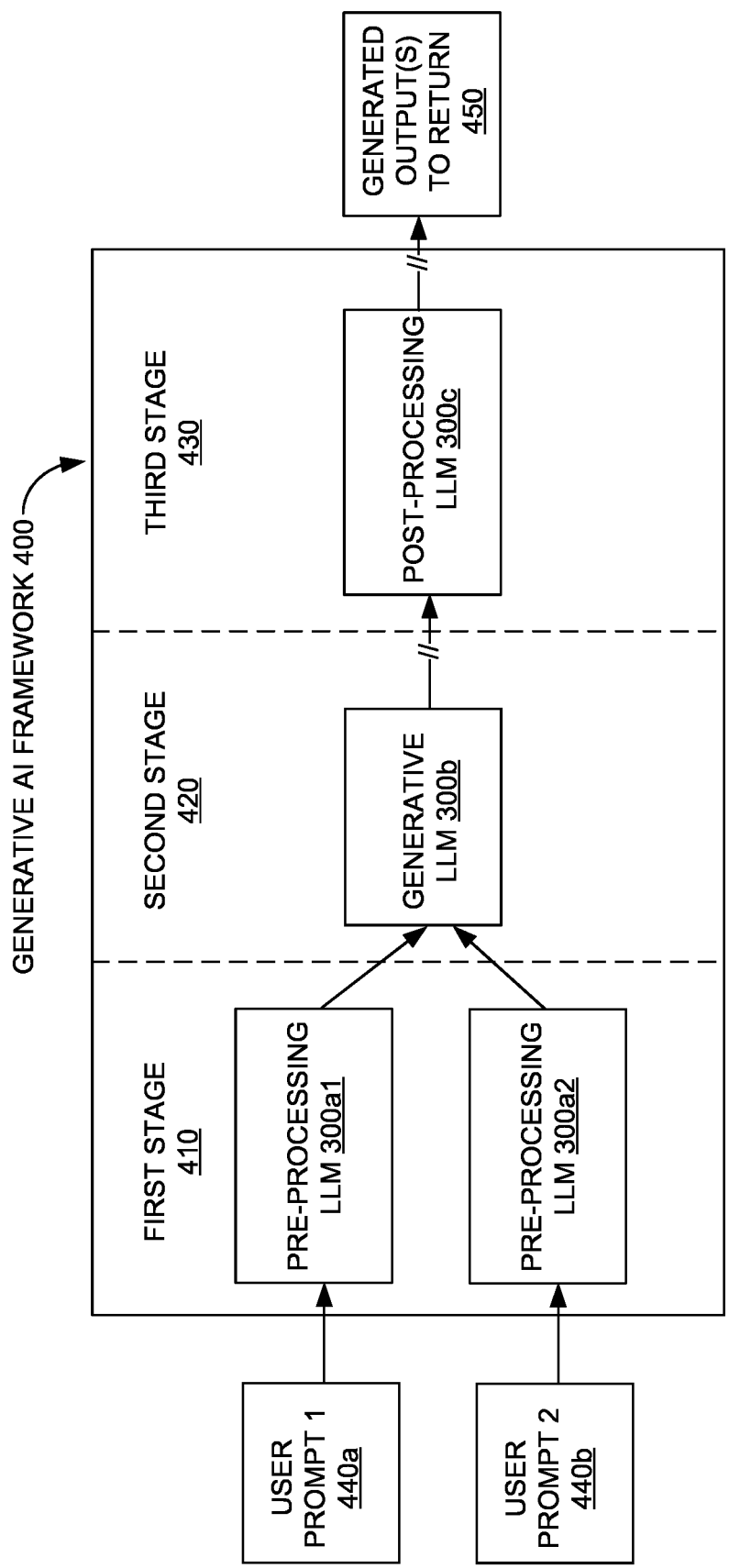
FIG. 4B is a schematic block diagram of a second exemplary embodiment of a Generative AI framework in which multiple LLMs are interconnected between first, second, and third processing stages in the framework in accordance with certain disclosed embodiments of the invention.

Further to the disclosed embodiments, the multiple distinct LLMs 300 in the Generative AI framework 400 may be combined in various ways and may comprise more than one LLM implemented in any of the first, second, and/or third stages of the framework. For example, FIG. 4B shows another exemplary embodiment of a Generative AI framework 400 that may be used in accordance with certain disclosed embodiments. In this example, the first processing stage 410 includes separate pre-processing LLMs 300a1 and 300a2. The different pre-processing LLMs 300a1 and 300a2 may be trained to process user prompts received from different groups of users 120, different types or categories of users, users located in different geographic regions, user prompts received in different time periods, and so forth. Accordingly, the Generative AI framework 400 may be configured to direct different received user prompts 440a and 440b to the pre-processing LLMs 300a1 or 300a2 configured to process the particular user prompt.

By way of example, a company may want to employ separate LLMs 300a1 and 300a2 in the first stage 410 of the framework 400 to analyze and transform input prompts 440a and 440b respectively directed to different divisions or departments within the company. In this example, the company may want a first LLM 300a1 in the first stage 410 to analyze and transform input prompts 440a directed to human-resources issues and a different LLM 300a2 in the first stage to analyze and transform input prompts 440b directed to engineering issues. In some embodiments, such as shown in FIG. 4B, the updated input prompts generated by each of the pre-processing LLMs 300a1 and 300a2 in the first stage 410 may be fed as inputs to a common generative LLM 300b in the second stage of the framework. More than one LLM 300b and 300c similarly could be implemented in the second and/or third stages of the framework 400.

In some alternative embodiments, the first stage 410 may be omitted entirely and only the second stage 420 and third stage 430 may be used in the framework. In other alternative embodiments, the third stage 430 may be omitted and only the first stage 410 and second stage 420 may be used. Those skilled in the art will appreciate that the multiple distinct LLMs that may be allocated among the different stages, preferably in a feed-forward configuration, in accordance with many different possible architectures for interconnecting LLMs between the stages of the Generative AI framework 400.

Further, in some embodiments, any of the LLMs 300a-c in the first, second, and third stages 410-430 may be configured to generate output data based, at least in part, on an application of their respective guardrails 320 to input data and/or output data. For example, if one or more guardrails 320 in the first LLM 300a contains a rule that a user prompt 360 including certain harmful language is received, or determines that the received prompt 360 requests information outside the scope of permitted user prompts, then the first LLM 300a may be configured to generate a predefined response instead of processing the received user prompt. The predefined response could include, but is not limited to, a response such as "This prompt contains language that is deemed inappropriate or otherwise outside the scope of this platform. Please send a new request." In this example, the framework 400 may be configured to send the predefined response generated by the first LLM 300a to the requesting user 120 without performing any additional processing using the second LLM 300*b* and/or third LLM 300*c*. Similarly, the guardrails 320 of the second LLM 300*b* and/or third LLM 300*c* may be configured to generate predefined responses based on their respectively received input data and/or generated output data. In some embodiments, the LLMs 300*a*, 300*b*, and/or 300*c* in the Generative AI framework 400 may be configured with one or more predefined messages to send to users corresponding to different rules and restrictions in their associated guardrails 320.

Figure 5:
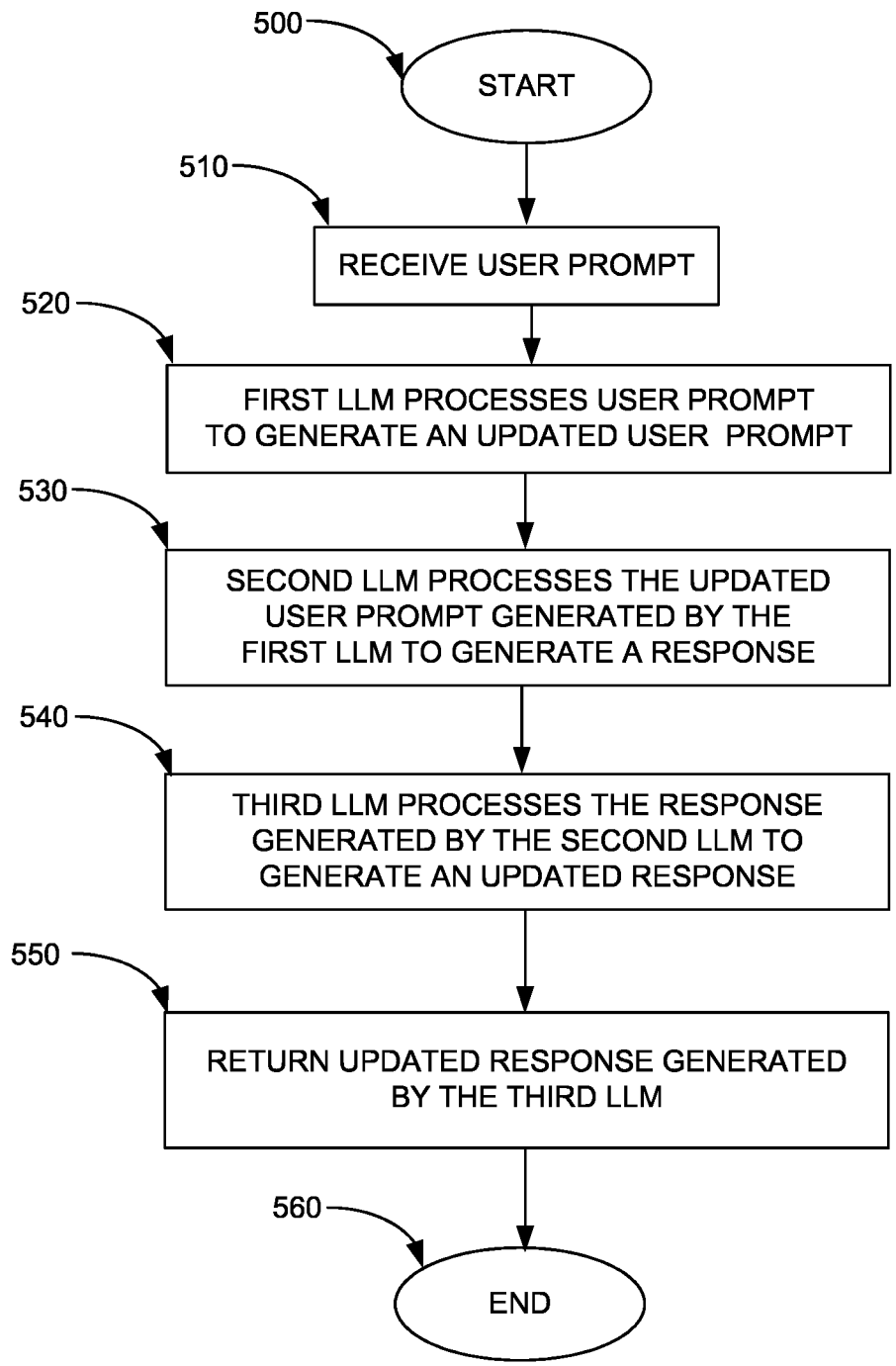
FIG. 5 is a flowchart illustrating an exemplary sequence of steps that may be performed using a Generative AI framework comprising multiple interconnected LLMs in accordance with certain disclosed embodiments of the invention.

FIG. 5 is a flowchart showing an exemplary sequence of steps that may be performed using a Generative AI framework 400 comprising multiple interconnected LLMs 300*a*, 300*b*, and 300*c* in accordance with certain disclosed embodiments of the invention. The sequence starts at step 500 and proceeds to step 510 where the Generative AI framework 400 receives a user prompt. In some embodiments, the received user prompt may have been communicated to the framework by a user 120 over the network 110, for example, using a cloud service or application specific programming functional call sent to a server 200. At step 520, a first LLM 300*a* processes the received user prompt to generate an updated user prompt, for example, as part of a first stage of the framework 400. The first LLM 300*a* may be used to detect and transform a jailbreaking/malicious user prompt, detect and transform an out-of-scope question(s) in the received user prompt, and thereby transform the received user prompt into an updated prompt that is better suited for generating a response using a second LLM 300*b*.

Next, at step 530, the updated user prompt is input to the second LLM 300*b* which, in turn, processes the updated user prompt to generate a response to the user prompt. The generated output response from the second LLM 300*b* is input to a third LLM 300*c* at step 540. The third LLM 300*c* processes the response that it received from the second LLM 300*b* to generate an updated response. The third LLM 300*c* may provide a hallucination and harmful-content checking stage, for example, configured to analyze and transform the generated response from the second LLM 300*b* to remove or correct AI hallucinations and harmful content. In this exemplary sequence of steps, at step 550, the updated response generated by the third LLM 300*c* is output from the Generative AI framework 400 to return the requesting user 120. The sequence ends at step 560.

Those skilled in the art will understand that the multi-staged Generative AI framework 400 may apply to any type of Generative AI system or method. Accordingly, although the Generative AI framework 400 is described in the disclosed embodiments in the context of generative text-based systems, such as chatbots and other online AI systems that provide textual answers to user prompts, in other alternative embodiments the multi-staged Generative AI framework 400 may be employed in other types of Generative AI systems and methods, such as for generating images, art, music, code, data, molecules, and/or other information based on input prompts provided by users.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions that may be executed on a computer, hardware, firmware, or a combination thereof. It also will be apparent to those skilled in the art that other processor and memory types, including various computer-readable media, may be used to store and execute program instructions pertaining to the techniques described herein. Further, the invention is not limited to any particular hardware platform or set of software capabilities.

While the disclosed embodiments have been described with reference to certain exemplary schematic block diagrams and flowcharts, those skilled in the art will appreciate that other variations and configurations are possible within the scope of the invention. For example, one or more of the exemplary functional modules disclosed herein may be combined or otherwise implemented within a single functional module. Similarly, one or more of the disclosed steps in the exemplary flow diagram of FIG. 5 may be combined or otherwise integrated with other disclosed steps. In some embodiments, the disclosed steps of the flow diagram may be performed in different orders than shown in the exemplary process of FIG. 5. Accordingly, the components of block diagrams and flow diagrams (e.g., modules, blocks, structures, devices, steps, features, etc.) may be variously combined, separated, removed, reordered, and replaced in a manner other than as expressly described and depicted herein.

While the disclosed embodiments illustrate various processes, it is expressly contemplated that various processes may be embodied as modules configured to operate in accordance with the techniques herein (e.g., according to the functionality of a similar process). Further, while certain processes have been shown or described separately, those skilled in the art will appreciate that the disclosed processes may be routines or modules within other processes.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A computer system configured to provide a generative artificial intelligence (AI) framework having multiple interconnected large language models, the computer system comprising:
   one or more physical processors;
   one or more network interfaces configured to receive a user prompt from a user; and
   a memory configured to store one or more computer-readable instructions that, when executed by the one or more physical processors, configure the computer system to implement the generative AI framework, the generative AI framework comprising:
   a first processing stage comprising a first large language model, wherein the first large language model is configured to process the user prompt received at the one or more network interfaces and generate an updated user prompt, wherein the first large language model is configured to use a first machine learning model to generate the updated user prompt;
   a second processing stage comprising a second large language model, wherein the second large language model is configured to process the updated user prompt generated by the first large language model and generate a response to the updated user prompt, wherein the second large language model is configured to use a second machine learning model to generate the response to the updated user prompt; and a third processing stage comprising a third large language model, wherein the third large language model is configured to process the response to the updated user prompt generated by the second large language model and generate a response to return to the user, wherein the third large language model is configured to use a third machine learning model to generate the response to return to the user, and wherein the third large language model is configured to transform the response to the updated user prompt generated by the second large language model to remove hallucinations from the response.

2. The computer system of claim 1, wherein the second large language model is configured to process the updated user prompt generated by the first large language model in order to build a generative answer in response to the updated user prompt.

3. The computer system of claim 1, wherein the third large language model is further configured to transform the response to the updated user prompt generated by the second large language model to remove harmful content from the response.

4. The computer system of claim 1, wherein each of the first large language model, second large language model, and third large language model comprises a different machine learning model.

5. The computer system of claim 1, wherein at least one of the first processing stage, second processing stage, or third processing stage comprises an additional large language model.

6. The computer system of claim 1, wherein at least one of the first large language model, the second large language model, or the third large language model comprises one or more guardrails.

7. The computer system of claim 6, wherein the at least one of the first large language model, the second large language model, or the third large language model is configured to generate a predefined response based on an application of the one or more guardrails to at least one of input data or output data.

8. The computer system of claim 1, wherein the first large language model, the second large language model, and the third large language model are configured to generate output data comprising words and phrases.

9. The computer system of claim 1, wherein the first large language model, the second large language model, and the third large language model each comprises a database for determining probabilities of words and phrases to include in a sequentially generated response.

10. The computer system of claim 1, wherein at least one of the first large language model, the second large language model, or the third large language model has been trained using an unsupervised machine learning process and further fine-tuned using a supervised machine learning process.

11. The computer system of claim 1, wherein the remote user communicates the user prompt to the computer system over a network using a cloud service.

12. A computer system configured to provide a generative artificial intelligence (AI) framework having multiple interconnected large language models, the computer system comprising:
one or more physical processors;
one or more network interfaces configured to receive a user prompt from a user; and
a memory configured to store one or more computer-readable instructions that, when executed by the one or more physical processors, configure the computer system to implement the generative AI framework, the generative AI framework comprising:
a first processing stage comprising a first large language model, wherein the first large language model is configured to process the user prompt received at the one or more network interfaces and generate an updated user prompt, wherein the first large language model is configured to use a first machine learning model to generate the updated user prompt, wherein the first large language model is configured to transform the user prompt received at the one or more network interfaces to remove malicious content, jailbreaking content, or content that is outside of a scope of permitted user prompts;
a second processing stage comprising a second large language model, wherein the second large language model is configured to process the updated user prompt generated by the first large language model and generate a response to the updated user prompt, wherein the second large language model is configured to use a second machine learning model to generate the response to the updated user prompt; and
a third processing stage comprising a third large language model, wherein the third large language model is configured to process the response to the updated user prompt generated by the second large language model and generate a response to return to the user, wherein the third large language model is configured to use a third machine learning model to generate the response to return to the user.

13. The computer system of claim 12, wherein the third large language model is further configured to transform the response to the updated user prompt generated by the second large language model to remove harmful content from the response.

14. The computer system of claim 1, wherein the first large language model is configured to transform the user prompt received at the one or more network interfaces to remove malicious content, jailbreaking content, or content that is outside of a scope of permitted user prompts.

15. The computer system of claim 12, wherein the second large language model is configured to process the updated user prompt generated by the first large language model in order to build a generative answer in response to the updated user prompt.

16. A method for providing a generative artificial intelligence (AI) framework having multiple interconnected large language models in a computer system, wherein the computer system comprises one or more processors and a memory configured to store computer-readable instructions that, when executed by the one or more processors, configure the computer system to implement the generative AI framework, the method comprising:
processing, at a first processing stage of the generative AI framework, a user prompt received from a user, the first processing stage comprising a first large language model, wherein the first large language model is configured to process the user prompt and generate an updated user prompt using a first machine learning model;
processing, at a second processing stage of the generative AI framework, the updated user prompt generated by the first large language model, the second processing stage comprising a second large language model, wherein the second large language model is configured to process the updated user prompt generated by the first large language model and generate a response to the updated user prompt using a second machine learning model; and processing, at a third processing stage of the generative AI framework, the response to the updated user prompt generated by the second large language model, the third processing stage comprising a third large language model, wherein the third large language model is configured to process the response to the updated user prompt generated by the second large language model and generate a response to return to the user using a third machine learning model, and wherein the third large language model is configured to transform the response to the updated user prompt generated by the second large language model to remove hallucinations from the response.

17. The method of claim 16, wherein the second large language model is configured to process the updated user prompt generated by the first large language model in order to build a generative answer in response to the updated user prompt.

18. The method of claim 16, wherein each of the first large language model, second large language model, and third large language model comprises a different machine learning model.

19. The method of claim 16, wherein at least one of the first large language model, the second large language model, or the third large language model is configured to generate a predefined response based on an application of one or more guardrails to at least one of input data or output data.

20. The method of claim 16, wherein the third large language model is further configured to transform the response to the updated user prompt generated by the second large language model to remove harmful content from the response.

21. The method of claim 16, wherein the first large language model is configured to transform the received user prompt to remove malicious content, jailbreaking content, or content that is outside of a scope of permitted user prompts.

22. A method for providing a generative artificial intelligence (AI) framework having multiple interconnected large language models in a computer system, wherein the computer system comprises one or more processors and a memory configured to store computer-readable instructions that, when executed by the one or more processors, configure the computer system to implement the generative AI framework, the method comprising:

processing, at a first processing stage of the generative AI framework, a user prompt received from a user, the first processing stage comprising a first large language model, wherein the first large language model is configured to process the user prompt and generate an updated user prompt using a first machine learning model, wherein the first large language model is configured to transform the received user prompt to remove malicious content, jailbreaking content, or content that is outside of a scope of permitted user prompts;

processing, at a second processing stage of the generative AI framework, the updated user prompt generated by the first large language model, the second processing stage comprising a second large language model, wherein the second large language model is configured to process the updated user prompt generated by the first large language model and generate a response to the updated user prompt using a second machine learning model; and processing, at a third processing stage of the generative AI framework, the response to the updated user prompt generated by the second large language model, the third processing stage comprising a third large language model, wherein the third large language model is configured to process the response to the updated user prompt generated by the second large language model and generate a response to return to the user using a third machine learning model.

23. The method of claim 22, wherein the third large language model is further configured to transform the response to the updated user prompt generated by the second large language model to remove harmful content from the response.

24. The method of claim 22, wherein the second large language model is configured to process the updated user prompt generated by the first large language model in order to build a generative answer in response to the updated user prompt.

25. A computer-readable medium configured to store computer-readable instructions for execution by one or more processors in a computer system, wherein execution of the computer-readable instructions configure the computer system to perform a method that provides a generative artificial intelligence (AI) framework having multiple interconnected large language models in a computer system, the method comprising:

processing, at a first processing stage of the generative AI framework, a user prompt received from a user, the first processing stage comprising a first large language model, wherein the first large language model is configured to process the user prompt and generate an updated user prompt using a first machine learning model;

processing, at a second processing stage of the generative AI framework, the updated user prompt generated by the first large language model, the second processing stage comprising a second large language model, wherein the second large language model is configured to process the updated user prompt generated by the first large language model and generate a response to the updated user prompt using a second machine learning model; and processing, at a third processing stage of the generative AI framework, the response to the updated user prompt generated by the second large language model, the third processing stage comprising a third large language model, wherein the third large language model is configured to process the response to the updated user prompt generated by the second large language model and generate a response to return to the user using a third machine learning model, and wherein the third large language model is configured to transform the response to the updated user prompt generated by the second large language model to remove hallucinations from the response.

26. The computer-readable medium of claim 25, wherein the third large language model is further configured to transform the response to the updated user prompt generated by the second large language model to remove harmful content from the response.

27. The computer-readable medium of claim 25, wherein the first large language model is configured to transform the received user prompt to remove malicious content, jailbreaking content, or content that is outside of a scope of permitted user prompts.

28. The computer-readable medium of claim 25, wherein the second large language model is configured to process the updated user prompt generated by the first large language model in order to build a generative answer in response to the updated user prompt.

29. A computer-readable medium configured to store computer-readable instructions for execution by one or more processors in a computer system, wherein execution of the computer-readable instructions configure the computer system to perform a method that provides a generative artificial intelligence (AI) framework having multiple interconnected large language models in a computer system, the method comprising:
processing, at a first processing stage of the generative AI framework, a user prompt received from a user, the first processing stage comprising a first large language model, wherein the first large language model is configured to process the user prompt and generate an updated user prompt using a first machine learning model, wherein the first large language model is configured to transform the received user prompt to remove malicious content, jailbreaking content, or content that is outside of a scope of permitted user prompts;
processing, at a second processing stage of the generative AI framework, the updated user prompt generated by the first large language model, the second processing stage comprising a second large language model, wherein the second large language model is configured to process the updated user prompt generated by the first large language model and generate a response to the updated user prompt using a second machine learning model; and
processing, at a third processing stage of the generative AI framework, the response to the updated user prompt generated by the second large language model, the third processing stage comprising a third large language model, wherein the third large language model is configured to process the response to the updated user prompt generated by the second large language model and generate a response to return to the user using a third machine learning model.

30. The computer-readable medium of claim 29, wherein the second large language model is configured to process the updated user prompt generated by the first large language model in order to build a generative answer in response to the updated user prompt.

31. The computer-readable medium of claim 29, wherein the third large language model is further configured to transform the response to the updated user prompt generated by the second large language model to remove harmful content from the response.

* * * * *